Dec. 28, 1948.  C. H. PHELPS  2,457,718
BALANCE-TESTING MACHINE ROTOR SUSPENSION SYSTEM
Filed May 24, 1945
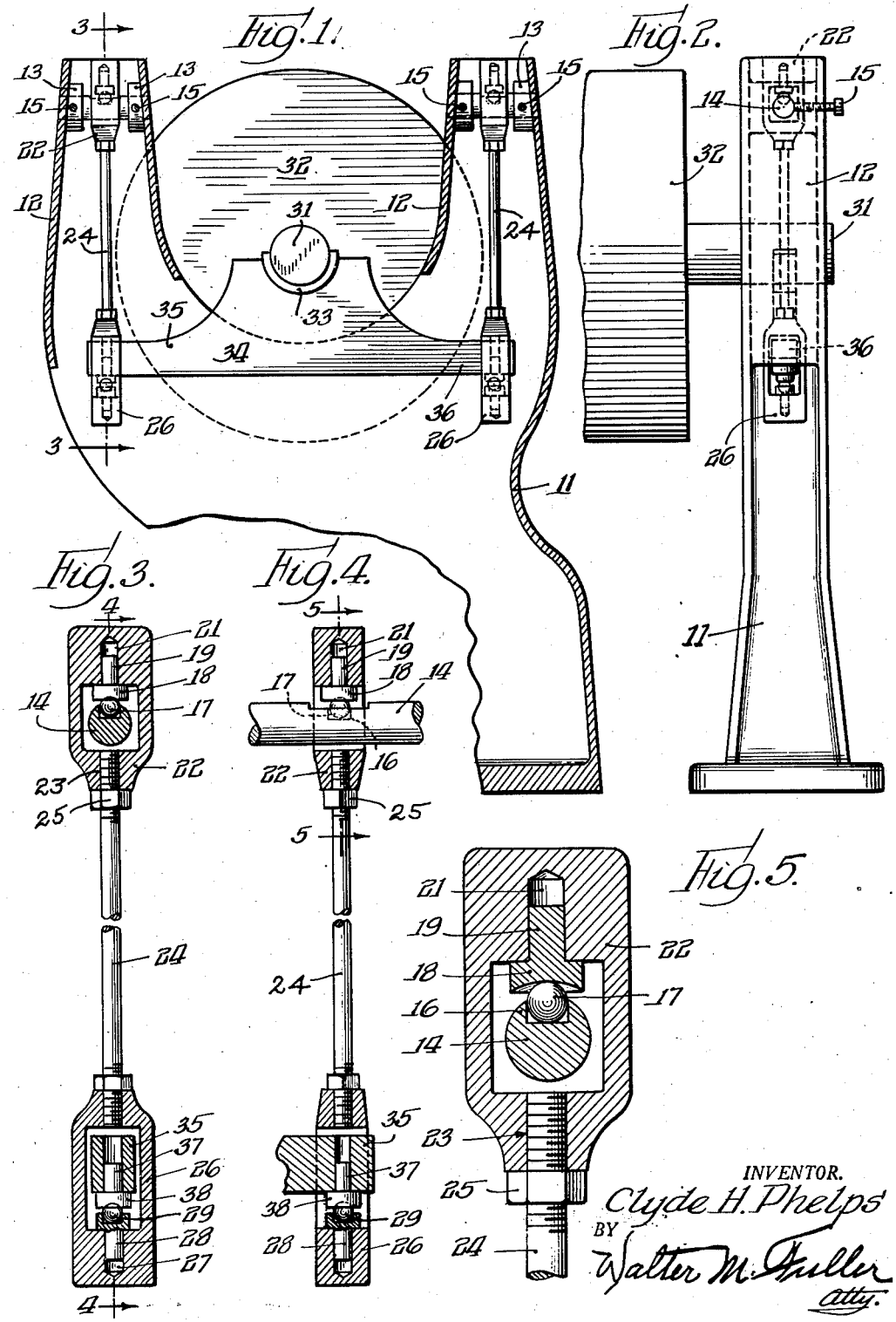
INVENTOR.
Clyde H. Phelps
BY
Walter M. Fuller
Atty.

Patented Dec. 28, 1948

2,457,718

UNITED STATES PATENT OFFICE 2,457,718

BALANCE-TESTING MACHINE ROTOR SUSPENSION SYSTEM

Clyde H. Phelps, Springfield, Ill., assignor, by mesne assignments, to Weaver Engineering Co., a corporation of Illinois Application May 24, 1945, Serial No. 595,542

5 Claims. (Cl. 74—579)

1

The current invention pertains to certain novel and innovatory features of structure and function in suspension means or systems particularly, but not necessarily exclusively, those employed in balancing-machines or balance-testing appliances.

Such apparatus embody suitable means for supporting the bearings of the rotor undergoing test, whereby the rotor may be revolved at the desired speed and at the same time be free to vibrate or oscillate in any direction in its own horizontal plane.

Some balancing-machines include structure to suspend the bearings of the rotor by small-diameter wires or thin strips, usually of spring-steel material, in order to provide the necessary flexibility so that the rotor may rotate and oscillate substantially freely in the specified plane.

A rotor thus suspended and operated represents a risk of material damage and personal injury by reason of the danger of breakage from the continuous flexing of the wire or strip.

Moreover, with certain weight rotors, and more particularly with some unbalanced rotors, a combination of loading and unbalance tends to form a resonant system due to the elastic properties of the small-diameter wires or thin strips, such resonance occurring at or near a required balancing speed, and, as the vibration therefrom is in the vertical plane, it tends to conceal the desired or intended oscillation through the horizontal plane and inaccurate indications of unbalance are the result.

Were a large-diameter wire or thick strip used, the free mounting or flexible feature would be reduced and therefore sensitivity and accuracy of unbalance indications would be impaired.

The present invention provides a substantially non-elastic, rigid suspension between the balancing-machine and its bearings, exempt from the danger of breakage from flexing and with a natural frequency far above the balancing-machine speed, but still retaining full sensitivity to oscillations and providing a mounting such that the rotor may rotate and oscillate substantially freely in the horizontal plane referred to.

The basis for this invention is the application of the principle of a portion of the sphere of one radius in rolling contact with the concave portion of a sphere of a larger radius, whereby practically point-contact is maintained with rolling action and relatively zero friction with free movement.

In order that those acquainted with this art may readily understand the invention and the

2 benefits accruing from its employment, a present preferred embodiment thereof has been illustrated in detail in the accompanying drawing to which reference should be had in connection with the following detailed description, like parts of the structure in the several views of the drawing having been supplied with the same reference numerals.

In such drawing:

Figure 1 is a fragmentary, transverse, vertical section through one end portion of the machine;

Figure 2 is a front-elevation of the same portion of the machine;

Figure 3 is a longitudinal vertical section on a larger scale on line 3—3 of Figure 1 through one of the supporting members;

Figure 4 is a lengthwise section on line 4—4 of Figure 3; and

Figure 5 is an enlarged section on line 5—5 of Figure 4.

Each of the twin standards 11 at the opposite ends of the machine, and of which only one is shown in the drawing, has two, spaced-apart, hollow, upstanding arms or projections 12, 12 in lateral or transverse register with one another, each such arm near its top internally having a pair of aligned bearings 13, 13 accommodating and supporting a stationary rod 14 normally held against lengthwise displacement by set-screws 15, 15, the top surface of each such rod at its middle point between its two bearings 13, 13, having a round cavity or recess 16 of substantially the same diameter as a hardened, ground and polished sphere or ball 17 the lower portion only of which it accommodates and which is of such size that the ball is held immovably in position therein by being forced into such relation.

Resting on the top of such ball, and in single-point contact therewith, is the hardened, ground and polished concave under surface of the head 18 of a round pin 19 tightly fitting and pressed into the cylindrical, downwardly-facing cavity 21 of a clevis 22 having in its lower end a screw-threaded hole 23 into which is screwed the threaded upper end of a rigid rod 24 fixedly held in the specified position by a lock-nut 25, the lower end of such rod being attached in like manner to the upper end of a reversed clevis 26 into the lower round aperture 27 of which is fixedly fitted a pin 28, the top head of which has a ball 29 stationarily held in the same manner that the sphere or ball 17 is maintained in the rod 14.

The shaft 31 of the rotor 32 is revolved in each of the two bearings 33, 33, of which only one is shown, such bearing being mounted on support 34 with forwardly and rearwardly extending arms 35 and 36 occupying the apertures through the corresponding pair of lower clevises 26, 26, each such arm 35 or 36 having a vertical hole therethrough in register with the pin 28 and having pressed and firmly secured therein, another pin 37 the under surface of whose enlarged head 38 is curved in a manner like that of the bottom surface of the member 18, each such curvature being a portion of a sphere of larger diameter than that of the corresponding sphere or ball 17 or 29.

From what precedes it will be observed that at each end of the machine the two fixed and stationary, horizontal rods 14, 14 support the corresponding upright threaded rod 24 through the cooperative elements 17, 18 and 22, and each of the members 24 at its lower end supports its arm 35 or 36 of the bearing-carrying member 34 through its elements 26, 28, 29 and 38.

This structure obviously provides free motion for the rotor in all directions in a substantially-horizontal plane practically free from friction, and since the rods 24 and their clevis ends together with the spheres or balls and the concave-head pins are of relatively heavy cross-section and accordingly are substantially rigid or non-elastic they are free from undesirable resonance effect.

Since the rods 24 are threadedly attached to their clevises, and are, therefore, variable as to length, such adjustment permits the securement of a predetermined natural frequency of swing or oscillation of the bearing-support 34 and this pendulum system may be adjusted to obtain a predetermined natural frequency which does not interfere with the desired operation of the balance-testing of the rotor.

Since both pins with concave-heads for each support face downwardly, nothing can fall into them or be retained in them with detrimental or objectionable effect.

Those skilled in this art will readily understand that the present invention as defined hereinafter is not necessarily limited and restricted to the precise and exact details of construction set forth and that various changes may be incorporated therein without departure from the novel principles of the invention and without the loss or sacrifice of any of their substantial benefits and advantages.

I claim:

1. In a suspension structure for at least a portion of a vibratory rotor-shaft bearing-support, the combination of a first suitably supported body having an upper convex partially-spherical surface, a second body having a concave partially-spherical undersurface bearing on and rockable on said upper convex surface, a hanger supported by and depending from said second body, a third body with a concave partially-spherical undersurface on said bearing-support, and a fourth body on the lower portion of said hanger and having a top convex partially-spherical surface supporting said third body by engagement with its concave undersurface, the curvature of said concave partially-spherical undersurface in each instance being of greater radius than that of its cooperating convex surface.

2. The combination set forth in claim 1, in which both said second and fourth bodies are rigid with said hanger.

3. The combination set forth in claim 1, in which said first body is stationary, in which said second and fourth bodies are rigid with said hanger, and in which said third body is rigid with said bearing-support.

4. The combination set forth in claim 1, in which said first body is stationary, said second and fourth bodies are rigid with said hanger, said third body is rigid with said bearing-support, and said hanger is rigid.

5. The combination set forth in claim 1, in which in each instance the concave partially-spherical undersurface of the second and third bodies is larger in area than the convex partially-spherical surface of the first and fourth bodies which they cover.

CLYDE H. PHELPS.

REFERENCES CITED

The following references are of record in the file of this patent:

UNITED STATES PATENTS

| Number | Name | Date |
|---|---|---|
| 594,492 | Skiles et al. | Nov. 30, 1897 |
| 844,440 | Braun et al. | Feb. 19, 1907 |
| 1,467,051 | Lovejoy | Sept. 4, 1923 |
| 1,805,825 | Hills et al. | May 19, 1931 |
| 2,349,530 | Weaver et al. | May 23, 1944 |

FOREIGN PATENTS

| Number | Country | Date |
|---|---|---|
| 413,959 | Germany | May 19, 1925 |
| 321,233 | Great Britain | Nov. 7, 1929 |